Jan. 4, 1938.  F. A. GAUGER  2,104,298
AUTOMATIC OVEN LIGHTER
Original Filed Jan. 16, 1929  2 Sheets-Sheet 1

Inventor
FRANK A. GAUGER

By Arthur R. Woolfolk
Attorney

Jan. 4, 1938.  F. A. GAUGER  2,104,298
AUTOMATIC OVEN LIGHTER
Original Filed Jan. 16, 1929  2 Sheets-Sheet 2
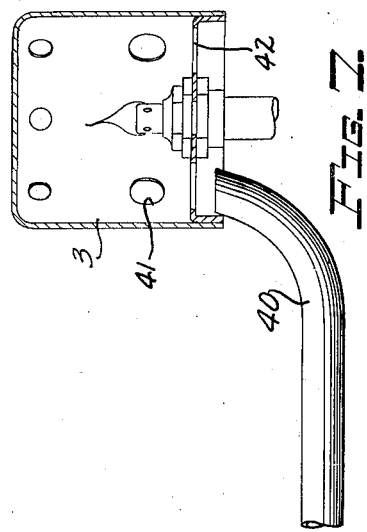
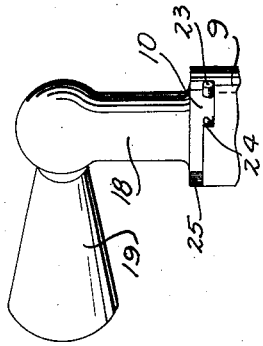
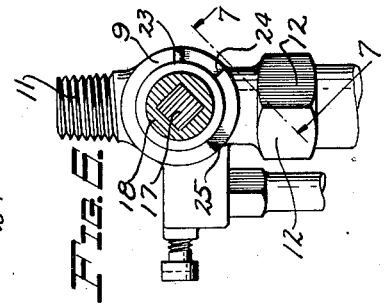
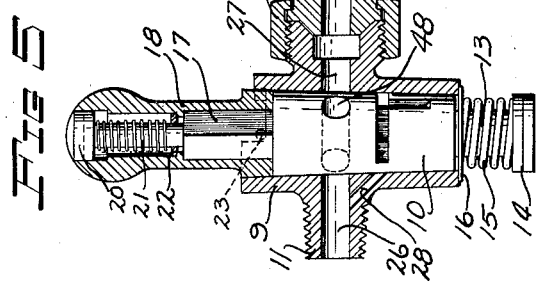
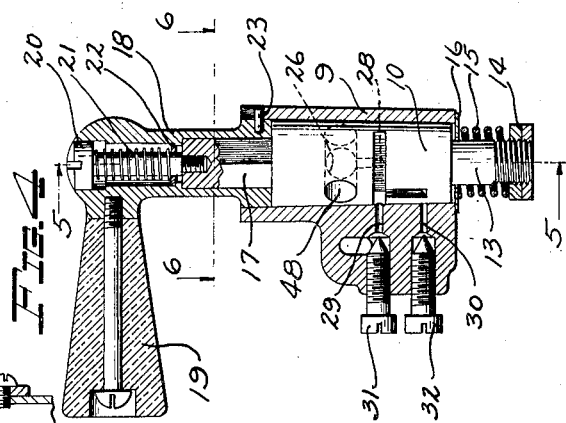
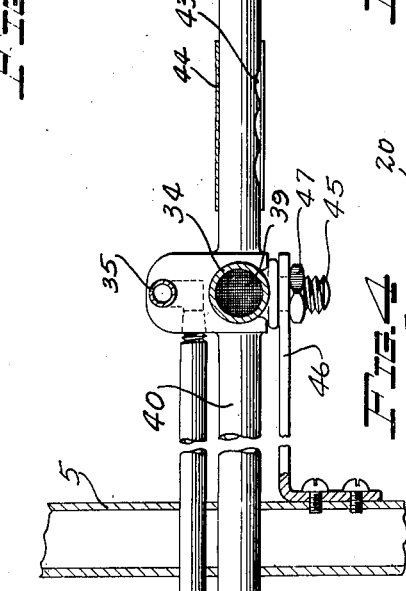
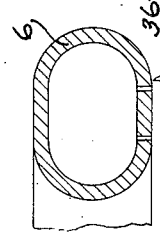
Inventor
FRANK A. GAUGER
By Arthur R. Woolfolk
Attorney Patented Jan. 4, 1938

2,104,298

UNITED STATES PATENT OFFICE 2,104,298

AUTOMATIC OVEN LIGHTER

Frank A. Gauger, Milwaukee, Wis., assignor, by mesne assignments, to The Cleveland Trust Company, Cleveland, Ohio, a corporation of Ohio Application January 16, 1929, Serial No. 332,896
Renewed October 2, 1937

10 Claims. (Cl. 158—115)

This invention relates to an automatic lighter, and is particularly directed to an oven lighter for gas stoves.

In gas stoves it is the usual practice to provide a group of burners and a substantially centrally located, constantly burning pilot which may be flashed outwardly by means of a button to light any of the burners. The oven is usually located to the side of the group of burners, and is provided with an oven burner which is lighted by means of a match. Frequently an oven regulator is provided for controlling the oven burner, and a pilot light is placed within the oven. However, the pilot light and burner must be lighted each time the oven is used with consequent annoyance to the operator. When the oven burner is finally cut off, the pilot light is also turned off and must be again lighted by a match, for instance, whenever the oven is used.

This invention is designed to overcome the defects noted above, and objects of this invention are to provide an automatic means for lighting the oven burner whenever the burner is turned on, so that the operator does not have to light the oven burner at any time, but may freely turn it on or off without any thought or effort, as the device functions in a wholly automatic manner.

Further objects are to provide an oven pilot which is turned on and automatically lighted when the oven burner is turned on, which cooperates with the conventional pilot light for the top burners universally employed for lighting the top burners of standard gas stoves, which is so constructed that means are provided for conducting a flame from the standard pilot to the oven pilot, and which functions in a regular sequence whenever the oven burner is turned on.

Further objects are to provide a construction which will cooperate with an oven regulator, which will light and maintain a pilot for the oven burner, which permits the oven burner to be completely cut off by the regulator under conditions where the regulator functions in this manner, and which cuts off the oven pilot whenever the main gas valve for the oven burner is closed.

Further objects are to provide a construction which is simple and easy to produce, which although wholly automatic is nevertheless free from delicate or easily damaged parts, which is positive in its action, which may be easily installed upon any standard gas stove whether equipped with an oven regulator or not, or which may be built as a unitary part of the gas stove when such stove is manufactured, and which is thoroughly reliable and substantially fool-proof.

An embodiment of the invention is shown in the accompanying drawings, in which:—

Figure 1 is a plan view of a gas stove equipped with the oven lighter.

Figure 2 is a side elevation of the oven lighter with parts in section.

Figure 3 is a sectional view, partly broken away, corresponding to a section on the line 3—3 of Figure 2.

Figure 4 is a sectional view on the line 4—4 of Figure 2.

Figure 5 is a sectional view on the line 5—5 of Figure 4.

Figure 6 is a sectional view on the line 6—6 of Figure 4.

Figure 7 is a fragmentary view looking in the direction indicated by the line 7—7 of Figure 6.

Figure 8 is a sectional view through the movable portion or plug of the main valve.

Figure 9 is a sectional view on the line 9—9 of Figure 8.

Figure 10 is a perspective view showing the main valve in closed position, and showing the various ports and ducts in dotted lines.

Figure 11 is a view similar to Figure 10 showing the main valve in its first or intermediate position.

Figure 12 is a view similar to Figure 10 showing the valve in its second or fully open position.

Although the invention is adapted for use in many different locations, it is eminently suitable for use in connection with a standard form of gas stove and, accordingly, it has been shown and will be described as applied to a gas stove. This mode of disclosing the invention is not, however, to be considered as in any way limiting the application of the underlying invention idea.

Referring to the drawings, it will be seen that a standard form of gas stove has been shown as provided with a plurality of burners 1 for the cooking top supplied from a header or manifold 2 and adapted to be lighted by the standard constantly burning pilot light 3. The pilot light 3 may be of the flash pilot type controlled by a button or valve 4 and adapted to project tongues of flame to the several burners 1 carried by the top of the stove in the usual manner. An oven 5 is located at one side of the stove and is provided with a burner 6. The oven burner may or may not be controlled by an oven regulator. In the form shown, an oven regulator 7 is employed, and is provided with a head 8 connected to the burner in the usual manner.

In practicing this invention, a manually controlled valve is provided for turning on and off the oven burner, and is so associated with other portions of the apparatus that the oven burner and an oven pilot light are automatically lighted whenever the manually controlled or main valve is opened.

The manually operated main valve consists of a body portion or casing 9, within which a plug or movable member 10 is mounted, as shown in Figures 2, 4, and 5. The casing or body portion 9 is provided with a threaded extension 11 which is screwed into the header 2. The body portion or casing 9 is also provided with a union 12, by means of which it is connected through the head 8 of the regulator to the oven burner 6. The plug 10 of the valve is conical or tapered and fits within a correspondingly tapered bored out portion of the body 9. This plug is provided with an extension 13, see Figure 4, which has a threaded portion for the reception of the nuts 14. A spring 15 loosely surrounds the extension and bears against a washer 16, forcing the washer against the bottom of the body portion 9. Thus the spring 15 insures the setting of the plug in a gas-tight manner within the body portion. The plug is provided at its upper end with a squared or polygonal extension 17 integral therewith. This extension loosely receives the hub or shank 18 of the manipulating handle 19. The upper end of the extension 17 receives the threaded lower end of a threaded screw 20. A spring 21 loosely surrounds this screw and bears at its upper end against the head of the screw, and at its lower end, against a washer 22 carried by an inwardly projecting annular flange formed on the shank 18 of the manipulating handle. Thus the handle may be raised upwardly or slid upwardly without upsetting the plug or movable portion 10 of the valve. In this connection it is to be noted that the spring 15 is relatively stiff or heavy, whereas the spring 21 is light in comparison thereto.

The purpose of having the handle portion axially movable with reference to the plug is to secure a two-step motion of the valve during the opening movement. In other words, the valve is so constructed that it is opened to an intermediate position, and thereafter a slight dwell occurs, and subsequently the valve is moved to its fully opened position. This operation is readily secured by providing the shank 18 of the valve with a projecting pin 23. The pin 23 rides within a cut-out portion of the casing or body portion 9 of the valve, and when the valve is opened to its intermediate position, the pin encounters an abrupt shoulder 24 formed integrally with the casing 9 as indicated in Figures 5 and 7. The valve is thus arrested in its opening motion, and it is now necessary to lift the handle in order to cause the pin or projection 23 to clear the shoulder or stop 24. Thereafter the valve may be moved to its fully opened position, the pin then encountering the final stop 25.

Thus in the ordinary operation of the valve it may be opened to an intermediate position, and thereafter the handle must be raised before the valve can be opened to its fully opened position.

The closed, intermediate, and fully opened positions of the valve are shown in Figures 10, 11, and 12, the ports or ducts in the casing being shown in dot and dash lines.

Referring to Figures 4, 5, and 8 to 12, inclusive, it will be seen that the body portion is provided with an inlet port 26 and an outlet port 27. The outlet port 27 is connected through the oven regulator to the oven burner as previously described, and the inlet port 26 opens into the header tube. The inlet port is also provided with a small downwardly extending duct 28 (see Figures 5, 10, 11, and 12). The casing or body portion is provided with a pair of small ducts or passageways 29 and 30, arranged one above the other, and controlled by means of the adjusting screws 31 and 32, as shown most clearly in Figure 4. The port or duct 30 communicates with a supply tube 33 leading to a small Bunsen mixing tube 34 for a purpose hereinafter to appear, and the duct 29 communicates with a pipe 35 leading to the oven burner pilot light 36 (see Figures 2 and 3). The Bunsen mixing tube 34 is provided with air openings 37 and a small nozzle 38. Further, it is provided with a gauze or wire mesh member 39 adjacent its outer end. This construction is also shown most clearly in Figures 2 and 3. The Bunsen mixing tube opens into an elongated tube 40, which at one end terminates below and slightly spaced from the end of the pilot light 36 (see Figure 3). The other end of the tube extends inwardly towards the center of the stove, as shown in Figure 1, to a point immediately adjacent the constantly burning standard pilot light indicated generally at 3 in Figures 1 and 3. This standard pilot light is regularly provided with a casing having apertures through its side wall, as indicated at 41, and apertures through its bottom wall, as indicated at 42. The inner end of the pipe 40 is turned upwardly and positioned immediately below one of the bottom apertures 42. Further, it is to be noted that the tube 40 is provided with a plurality of apertures 43 through its lower side, which may be opened or closed or otherwise regulated by means of the split sleeve 44.

It is to be noted from Figures 2 and 3 that the Bunsen burner 34 may be provided with a threaded downwardly projecting extension 45, which is passed through an angle iron 46 secured to the side wall of the oven 5 to afford adequate support to the apparatus. This extension may be locked to the angle iron by means of a nut 47, as shown in Figure 3.

Referring to Figures 4, 5, and 8 to 12, inclusive, it will be seen that the plug 10 of the valve is provided with a main passageway 48 extending diametrically therethrough and controlling communication between the supply duct 26 and the duct 27 leading to the burner. In the normal and intermediate positions of the valve this passageway is out of communication with the ducts 26 and 27. In final position of the valve as shown in Figure 12 the duct 48 connects the ducts 26 and 27. It is to be noted also that the plug of the valve is provided with a slot or cut-out portion 49 extending part way through the plug. Further, a vertical slot or passageway 50 communicates with the slot 49. When the valve is in cut-off position, the slot 49 does not communicate with the by-pass or duct 28. When, however, the valve is turned to intermediate position, as shown in Figure 11, the slot or groove 49 communicates with the by-pass openings 28, and the slots 49 and 50 establish communication between this by-pass duct 28 and the ducts 29 and 30. When the valve is in this position, it will be seen that gas is supplied both the pilot 36 for the oven burner and the Bunsen mixing tube 34. The Bunsen mixing tube is so made that it produces a relatively rare or thin mixture of gas and air. This mixture passes into the tube 40 and fills such tube. The inner end of the tube discharges a part of this combustible mixture adjacent the constantly burning standard pilot light 3, and an explosion takes place within the tube. The flame is propagated along the tube to its outer end adjacent the pilot light 36 for the oven burner and, consequently, the oven burner pilot light is ignited.

The valve is thereafter turned to its fully opened position, as shown in Figure 12. The valve when in this position cuts off further supply of gas to the Bunsen burner, but allows gas to freely flow to the oven pilot light 36, as the slot 49 remains in communication with both the ducts 28 and 29, as may be seen from Figure 12.

It is to be noted that a slight dwell is attained when the valve is opened to its intermediate position, as it is then necessary to raise the handle in order to continue the opening motion of the valve.

The sleeve 44, see Figure 3, is adjusted with reference to the holes 43 to insure the proper consistency of the mixture of gas and air. For example, the sleeve is set at one position when the device is used in a city supplied with artificial gas, and in another position when the device is used in a city supplied with natural gas. However, after the initial adjustment, no further adjustment is needed.

The oven pilot light 36 is in reality an intermediate burner designed to be ignited by flashback of flame through the conduit 40 in turn ignited by the constantly burning pilot light 3. The intermediate burner is arranged in such proximity to the oven burner that gas issuing from the latter will be ignited by the flame of the intermediate burner.

From actual tests with this device it has been found that the pilot light for the oven burner is always lighted at each operation of the main, manually controlled valve. No thought is required on the part of the operator, as he is merely required to turn the valve to the intermediate position and thereafter to the final position, the slight dwell being obtained as has been described in detail above.

In the particular form of my invention here disclosed a peculiar action takes place in the conducting tube 40 for conducting the flame to the pilot light of the oven burner. It has been found that the flame oscillates back and forth throughout the entire length of the tube 40, and, consequently, even if the oven burner pilot light does not light at the first instant, it will light immediately thereafter due to the oscillating of the flame in the tube 40. This oscillation takes place with great rapidity, and thereby insures the lighting of the oven burner pilot light.

It is apparent that the device may be used with or without an oven regulator. The oven burner pilot light burns continuously while the main valve is turned on. The oven regulator, if one is used, may completely cut off the oven burner at times without any interference with the action of the device, as the pilot light for the oven burner continues to burn.

It will be seen that a novel form of oven lighter has been provided by this invention which is free from any fragile or delicate parts, which is not likely to get out of order, and which is substantially fool-proof.

It will be seen further that an oven lighter has been provided which functions in a wholly automatic manner, and which requires no thought on the part of the operator, as this oven lighter functions whenever the main, manually controlled oven valve is operated.

It is also to be noted that the apparatus readily lends itself to use with standard gas stoves with scarcely any alteration thereof, and that also it may readily be built into the stove at the time the stove is manufactured.

It is intended that the expression "gas stove" be interpreted to include the ordinary gas stove, a gasoline stove, or other stoves or devices of this general type.

Although the invention has been described in considerable detail, it is to be understood that the description is to be interpreted as illustrative rather than limiting, as the invention may be variously embodied and is to be determined only as claimed.

I claim:

1. In a stove having a constantly burning pilot light, the combination of an oven remote from said constantly burning pilot light, an oven burner, an oven pilot light, a valve controlling said oven burner and said oven pilot light, an oven regulator controlling said oven burner, flame conducting means extending from adjacent the oven pilot light to adjacent the constantly burning pilot light, and means for supplying said flame conducting means with a combustible mixture of fuel and air, said means being controlled by said valve and being independent of said burner.

2. In a stove having a constantly burning pilot light: the combination of an oven; an oven burner; an oven pilot light; means for conducting a flame from said constantly burning pilot light to said oven pilot light; a valve having a closed position, an open position, and an intermediate position; means for temporarily stopping said valve in its intermediate position during opening motion of said valve, said valve supplying fuel to said burner when in open position and supplying fuel to said oven pilot light when in intermediate and open positions; and means controlled by said valve for supplying a combustible mixture of fuel and air to the flame conducting means when said valve is in intermediate position.

3. An automatic oven burner lighter for a gas stove comprising in combination with a constantly burning pilot light remote from the burner, a flame conducting conduit extending between the oven burner and the remote pilot light, and means for supplying a mixture of gas and air to said conduit from outside of the oven, whereby the mixture in said conduit will be ignited by the remote pilot light and the flame will be propagated through the conduit to its opposite end for igniting the oven burner.

4. An automatic oven burner lighter having a constantly burning pilot light remote from the oven, an oven pilot burner arranged in such proximity to the oven burner as to ignite gas issuing from the latter, a flash-back conduit arranged between the remote pilot light and the oven pilot burner, and means for supplying gas to said oven pilot burner and said conduit and also to the oven burner, said means including a Bunsen mixer for delivering a relatively rare mixture of gas and air to the conduit, whereby the oven pilot burner will be ignited by propagation of flame in the conduit ignited by the pilot light, said means causing the oven pilot burner to burn at an approximately uniform flame regardless of variations in the gas supply to the oven burner.

5. An automatic oven burner lighter for application to a gas stove having a hand valve adapted to be moved between an open and a closed position for controlling the supply of gas to the oven burner comprising, an igniting source remote from the oven, an intermediate burner, means for igniting said intermediate burner including a flame conducting conduit extending from said intermediate burner to said igniting source, and means for causing gas to be supplied to said intermediate burner and said flame conducting conduit when said hand valve is operated in an initial opening movement and upon further opening movement for causing the supply of gas to said flame conducting conduit to be discontinued after said intermediate burner pilot has been ignited.

6. An automatic oven lighter for application to a gas stove equipped with an oven regulator and a hand valve at the supply side of the regulator for controlling the supply of gas thereto comprising an igniting source remote from the oven, an intermediate burner, means for igniting said intermediate burner including a flame conducting conduit extending from said intermediate burner to said igniting source, and means for causing gas to be supplied to said intermediate burner and said flame conducting conduit when said hand valve is operated in an initial opening movement and upon further opening movement for causing the supply of gas to said flame conducting conduit to be discontinued after the oven burner pilot has been ignited, said gas supply being separate from the gas supplied to the oven burner regulator.

7. In an oven burner lighter for gas stoves, an oven burner pilot adapted to ignite the oven burner, a flame conducting conduit extending from the oven burner pilot to a point remote from the oven, means for igniting gas from the flame conducting conduit at said remote point, and means for supplying gas to the oven burner, the oven burner pilot and the flame conducting conduit, arranged so that the gas supply to the oven burner pilot will be continued while gas is supplied to the oven burner and the gas supply to the flame conducting conduit will be discontinued after the oven burner pilot has been ignited.

8. An oven burner lighter as set forth in claim 7, in which the gas supply to the flame conducting conduit is discontinued throughout that portion thereof remote from the oven burner pilot.

9. In a gas stove, in combination, an oven compartment having an oven burner, a pilot light remote from the oven compartment, a pilot burner in the oven compartment in proximity to the oven burner for lighting the same, a flash tube extending from said remote pilot light to a point in proximity to said pilot burner for lighting the same, and means for supplying gas to said pilot burner and to said flash tube including a separate Bunsen mixer for supplying a mixture of gas and air to the flash tube, the Bunsen mixer being located with its air supply outside of the oven compartment away from heat and circulation effects of the oven burner.

10. In a gas stove, in combination, an oven compartment having an oven burner, a pilot light remote from the oven compartment, a pilot burner in the oven compartment in proximity to the oven burner for lighting the same, a flash tube extending from said remote pilot light to a point in proximity to said pilot burner for lighting the same, means for supplying gas to said pilot burner and to said flash tube including a separate Bunsen mixer for supplying a mixture of gas and air to the flash tube, and control means for the gas supplying means for simultaneously delivering gas to the oven pilot burner and to the Bunsen mixer, and subsequently supplying gas to the oven burner and continuing the supply to the oven pilot burner while discontinuing the supply to said Bunsen mixer.

FRANK A. GAUGER.